UNITED STATES PATENT OFFICE.

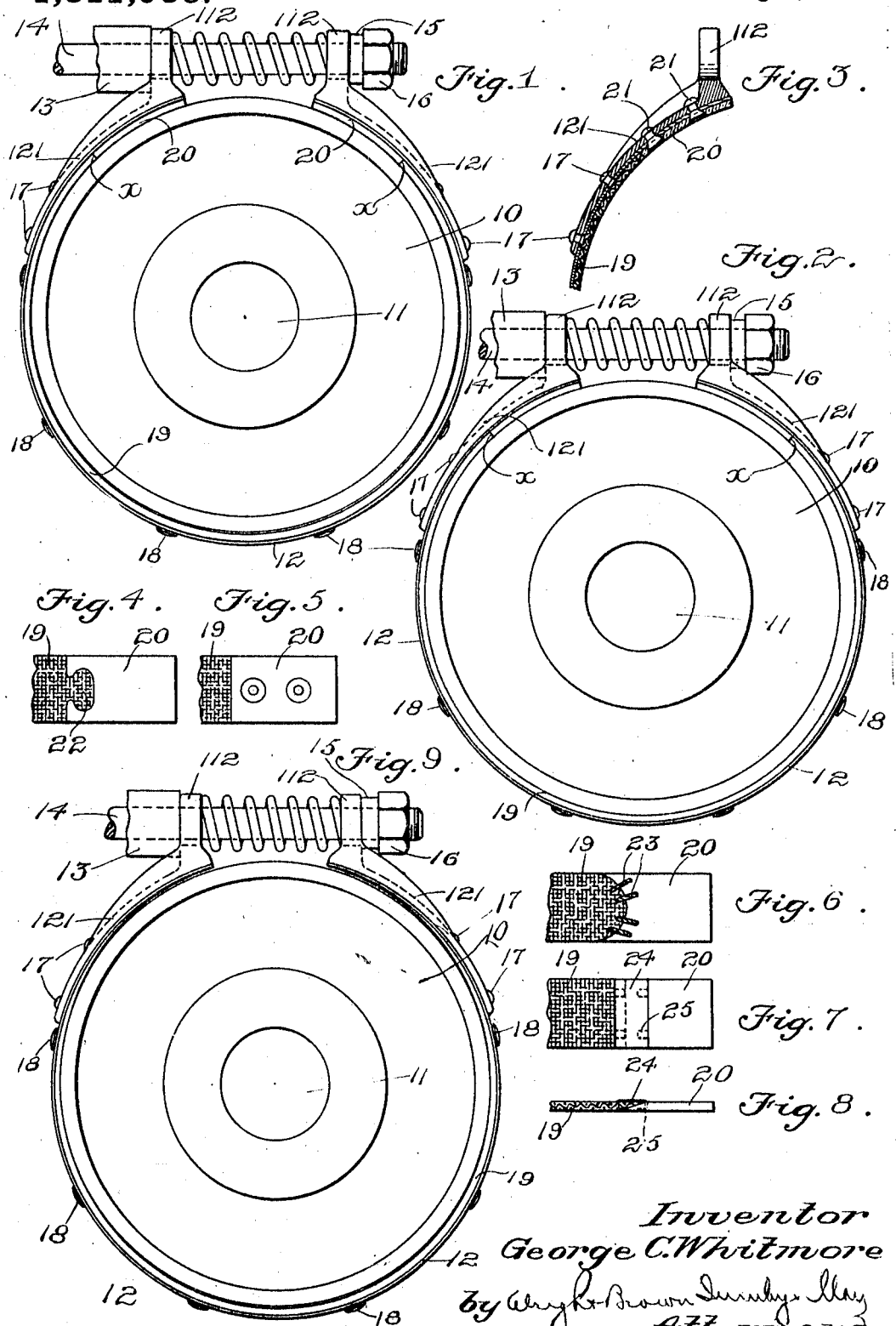
G. C. WHITMORE.
BRAKE BAND.
APPLICATION FILED APR. 25, 1917.
1,311,936. Patented Aug. 5, 1919.
Inventor
George C. Whitmore
by Wright Brown Quinby May
Attorneys

GEORGE C. WHITMORE, OF PORTLAND, MAINE, ASSIGNOR OF ONE-HALF TO URBAN A. TOWLE, OF PORTLAND, MAINE.

BRAKE-BAND.

1,311,936.  Specification of Letters Patent.  Patented Aug. 5, 1919.

Application filed August 25, 1917. Serial No. 188,248.

*To all whom it may concern:*

Be it known that I, GEORGE C. WHITMORE, a citizen of the United States, residing at Portland, in the county of Cumberland and State of Maine, have invented new and useful Improvements in Brake-Bands, of which the following is a specification.

This invention relates to brakes such, for example, as are employed in automobiles, in which the brake disk rotates within a circular split band that may be clamped upon the peripheral face thereof. Because of their simplicity, such brake mechanisms have gone into extensive use. It has been the practice to equip the operative portion of the band with a brake lining made in whole or in part of woven asbestos or like material, to provide the frictional resistance to the rotation of the disk, such lining being riveted or otherwise secured at different points along its length to the band. The ends of the band are ordinarily provided with lugs with which the brake rod is engaged to draw the ends of the band together and thus reduce the diameter of the band, the lugs being separated a material distance on a line tangential to a circle inscribed about the axis of the disk. Heretofore the ends of the brake lining have terminated at the ends of the bands, and experience has shown that the wear upon the lining has localized at the ends of the band, causing them to become reduced in thickness, frayed and rapidly to be disintegrated. As a result of long observation and experiment, I have ascertained this to be due to the fact that the ends of the lining rest upon the disk when the band is open, and that, in drawing the ends of the band together, the principal points of contact between the band and the brake disk are at the ends of the band, probably because the closing movement of the lugs is in a straight line. In any event, whatever the cause may be, it is the fact that the brake lining is subjected to wear almost entirely at or near the ends thereof, and that, because of the localization of the frictional engagement of the lining and the disk at these points, the linings are short-lived and constantly must be replaced.

As a result of long continued experiment, I have ascertained that, if the band is provided with wear-resistant and non-frictional material at the ends thereof, and forming a continuation of the brake lining, it is possible to reduce the wear on the ends of the lining, to distribute the wear more evenly along the entire length of the lining, and consequently greatly to increase the life of the latter.

My invention therefore consists in providing the band at portions adjacent the ends thereof with a suitable wear-resistant material, such material forming, as it were, a continuation of the brake lining, to which, if it is desired, it may be secured. Any suitable material may be employed which will serve the purpose, but, as an example of what has proven to be highly effective, I use vulcanized fiber, which experience has shown resists wear, and in use soon presents a compact smooth glass-like surface.

On the accompanying drawings,—

Figure 1 illustrates a brake mechanism embodying my invention, the brake band being open.

Fig. 2 shows the same parts with the band closed upon the brake disk.

Fig. 3 illustrates one end of the band and the lining in longitudinal section.

Figs. 4 to 8 inclusive illustrate different ways in which the wear-resistant ends may be secured to the lining.

Fig. 9 shows a brake mechanism having the usual lining, and illustrates the condition of the lining after a short period of use.

It will be understood at the outset that the invention is not limited to use on automobiles, nor to the specific form of disk band and clamping mechanism which I have illustrated and shall subsequently describe, as it may be employed in all kinds of band brakes.

The device, which I have selected as exemplifying an embodiment of the invention, is the brake of the well known Ford car. It consists of a disk 10 on a rotary shaft 11, a resilient metallic band 12, notched lugs 112, 112, a stationary tubular member 13 bearing against one of the lugs, and a brake rod 14 provided with a washer 15 and a nut 16 bearing against the other lug. When the rod 14 is moved to the left, it draws the lugs together and clamps the band upon the disk, as shown in Fig. 2. The lugs consist of castings or drop forgings, the base flanges 121 of which are riveted to the band by rivets 17.

According to the ordinary construction shown in Fig. 9, the band is provided with 110 a lining of woven asbestos fiber, or the like, which forms an article of commerce sold under the names "raybestos," "multibestos," etc., there being many of such articles sold under different trade names. This lining terminates at the ends of the band and is secured by rivets 18, of which it is customary to locate, several at or near said ends (not shown), and which, when the ends of the lining become worn, dig into and groove the peripheral face of the disk.

In accordance with my invention, however, I employ such a lining as indicated at 19, but, instead of having the lining coextensive in length with the band, it terminates at the points marked $x$ $x$. In other words, the lining extends through an arc of approximately 270° more or less. Beyond the end of the lining there are the extensions 20 which are substantially the same in thickness as the lining and equal in width, but which are formed of some wear-resistant material, preferably hard or vulcanized fiber. These strips of fiber are secured at the ends of the band by suitable fastenings, such as rivets 21, which are placed in countersunk apertures so that their inner ends are removed from the wearing surface of the strips or extensions 20. These wear strips lie directly under the lugs 112 and extend laterally therefrom so as to occupy a portion of the space beneath the base flanges 121 of said lugs. The wear strips may, if desired, be permanently secured in place so that they need not be removed when the asbestos lining 19 is removed for replacement by a fresh lining, or they may be connected to the extremities of such lining as indicated in Figs. 4 to 8 inclusive. In Fig. 4, the end of the lining 19 is formed with a head 22 which occupies a complemental socket formed in the extension or strip 20. In Fig. 5, the parts 19 and 20 are not directly connected but are shown as being contiguous. In Fig. 6, the end of the lining 19 is curved convexly so as to fit in the concave end of the wear strip body and it is attached to said strip by stitches 23 which may be sunk into the surfaces of said parts. In Figs. 7 and 8, the strip 20 is connected to the lining 19 by a belt fastener 24 of metal, the two ends of the parts being complementally skived or beveled so that one lies upon the other. The belt fastener 24 is provided with prongs 25 which may be inserted into the parts 19 and 20 and clenched as illustrated in Fig. 8.

When the band is loose upon the brake disk, the wear strips 20 rest loosely upon the disk, as shown in Fig. 1, so that very little wear is experienced by the lining. When the band is closed upon the disk, it is my experience that the wear is distributed practically equally along the entire length of the lining. In using vulcanized fiber, which forms a stable article of commerce, the surface becomes glazed and smooth, and apparently more or less compacted, with the result that the strips 20 may be employed without renewal for a long time. I have found that the brake linings, when equipped with wear-resistant extensions as herein described, may be used for a period of three or four times as great as that in which it is possible to employ the lining ordinarily used. By doing away with the possibility of exposing the rivets to the disks by the wear of the lining, I am able to save the disks from injury and consequently lessen the expense of the up-keep.

Having thus explained the nature of my said invention and described a way of making and using the same, although without attempting to set forth all of the forms in which it may be made or all of the modes of its use, what I claim is:

1. A brake lining for band brakes, consisting of a strip of the usual fibrous material affording the means for frictionally gripping the brake wheel, and end extensions therefor of non-frictional wear-resistant material.

2. A brake lining for band brakes, consisting of a strip of the usual fibrous material, and end extensions therefor of non-frictional vulcanized fiber substantially equal in thickness to said fibrous strip.

3. The combination with a brake disk and a split band for coöperation therewith, of a lining consisting of strips of non-frictional wear-resistant material at the end portions of the band, and an intervening strip of the usual flexible material.

4. The combination with a brake disk and a split band for coöperation therewith having lugs for engagement with the band closing devices, of a lining attached to the inner face of said band and consisting of an intermediate portion of the usual fibrous material, and end portions, underlying the lugs, formed of wear-resistant non-frictional material.

5. The combination with a brake disk and a split band for coöperation therewith having lugs for engagement with the band closing devices, of a lining attached to the inner face of said band and consisting of an intermediate portion of the usual fibrous material, and end portions, underlying the lugs, formed of wear-resistant non-frictional material, said intermediate and end portions being connected independently of their attachment to the band.

In testimony whereof I have affixed my signature.

GEORGE C. WHITMORE.